United States Patent [19]

Kamin

[11] 4,148,062

[45] Apr. 3, 1979

[54] TELEVISION-BASED ALARM SYSTEM

[75] Inventor: Gerhard Kamin, Traisa, Fed. Rep. of Germany

[73] Assignee: Robert Bosch GmbH, Stuttgart, Fed. Rep. of Germany

[21] Appl. No.: 787,956

[22] Filed: Apr. 15, 1977

[30] Foreign Application Priority Data

Apr. 17, 1976 [DE] Fed. Rep. of Germany ....... 2617112

[51] Int. Cl.2 ................................................ H04N 7/18

[52] U.S. Cl. .................................... 358/105; 358/108; 340/146.3 Q

[58] Field of Search ............... 358/105, 138, 108, 139, 358/126; 340/258 B, 258 D, 146 Q

[56] References Cited

U.S. PATENT DOCUMENTS

| | | | |
|---|---|---|---|
| 3,603,729 | 9/1971 | Sperber | 358/105 |
| 3,743,768 | 7/1973 | Copland | 358/105 |
| 3,781,468 | 12/1973 | Chomet et al. | 358/105 |
| 3,825,676 | 7/1974 | Ramsden, Jr. | 358/105 |

*Primary Examiner*—Robert L. Griffin
*Assistant Examiner*—Edward L. Coles
*Attorney, Agent, or Firm*—Littlepage, Quaintance, Murphy, Richardson and Webner

[57] ABSTRACT

A television-based alarm system comprises a plurality of television cameras connected in time-multiplex mode to a set of discriminators. The discriminators are sequentially connected to receive the video signals from the cameras, the arrangement being such that each discriminator receives the video signal from a predetermined camera. Each discriminator is adapted to generate a pulse upon the occurrence of a predetermined characteristic in the picture content of the video signal corresponding to a particular type of event in the field of view of the camera. The discriminating functions of the discriminators differ so that different types of event may be detected by the various cameras. The pulses generated by the discriminator at any time connected to a camera are logically combined with a masking signal which defines a portion or portions of the field of view from which pulses are not required. A plurality of different masking signals are provided and these are provided in sequence to the discriminators. The pulses may then be logically coupled with a second masking signal. In such case the first masking signal may define a series of horizontal or vertical stripes for detecting movement in a particular direction and the second masking signal may restrict the field of view to a part only of the total possible field of view. After the logical coupling the remaining pulses are evaluated according to a predetermined criterion to generate an alarm signal.

43 Claims, 1 Drawing Figure

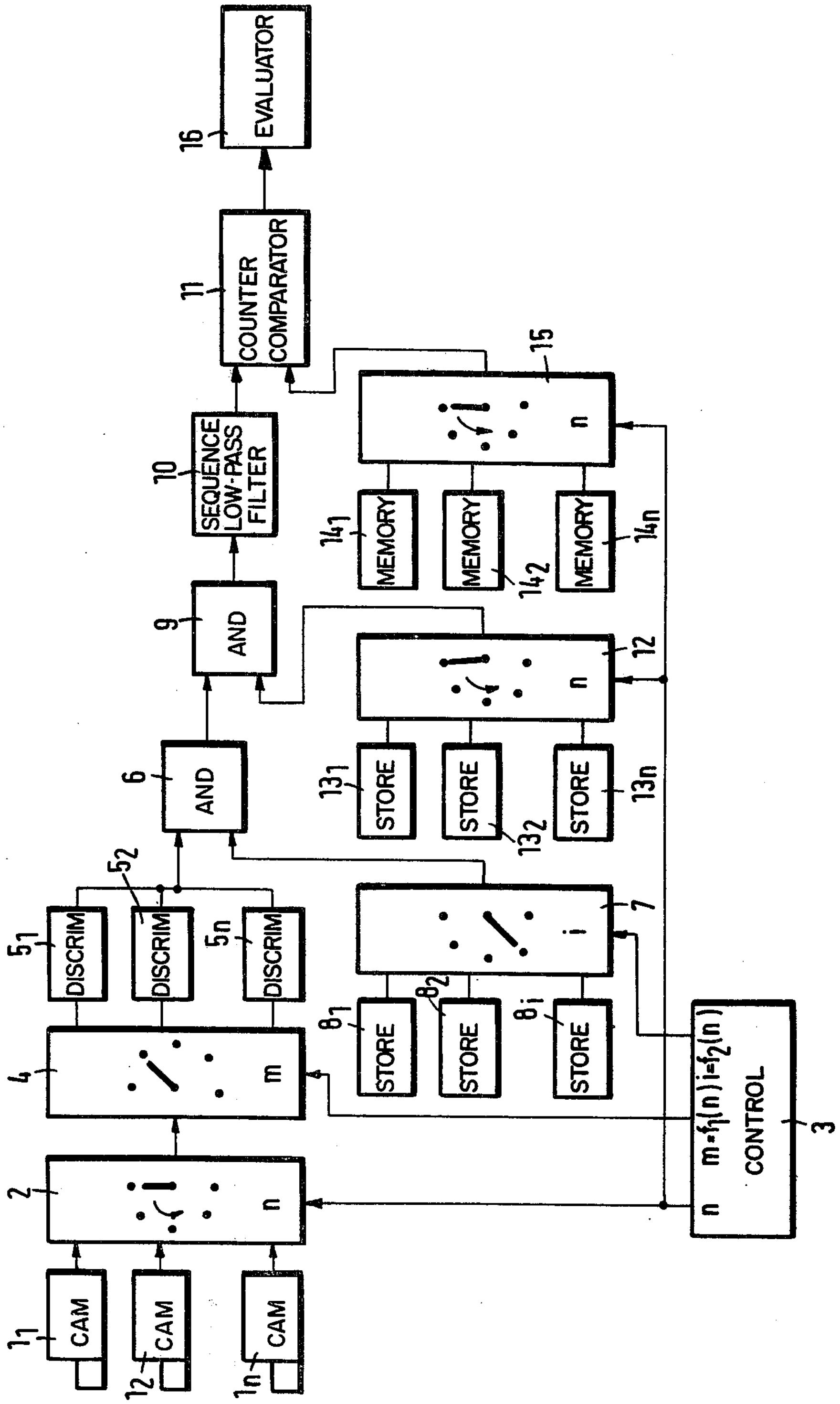
CAM
CAM
CAM
DISCRIM
DISCRIM
DISCRIM
AND
AND
SEQUENCE LOW-PASS FILTER
COUNTER COMPARATOR
EVALUATOR
STORE
STORE
STORE
STORE
STORE
STORE
MEMORY
MEMORY
MEMORY
m=f1(n) i=f2(n)
CONTROL

TELEVISION-BASED ALARM SYSTEM

BACKGROUND OF THE INVENTION

1. Field of the Invention

The invention relates to an alarm system for detecting a movement or a change in a field of view supervised by a television camera.

2. Description of the Prior Art

In German Published Patent Specification No. 22 55 876 there is disclosed a television-based alarm system wherein uniform brightness regions within the scene viewed by a television camera are suppressed. For this purpose the video signal produced by the television camera is taken through a resonance filter. The signal thus obtained is rectified and transferred to a capacitively coupled band-pass filter. The band-pass filter serves for eliminating very slow or very quick changes. Thereafter any resulting single variation indicates a scene variation in the supervised field of view and causes a signal to be emitted. The response reliability of such an alarm system is small because it reacts only to relatively large dynamic changes of scene. A further disadvantage is that the response sensitivity does not vary and cannot therefore be suited to the detection of different scenic events.

Furthermore there is disclosed in German Published Patent Specification No. 20 02 478 an arrangement for supervising objects with the use of a television camera, wherein there is connected to the television camera an amplitude filter combined with an electronic counter. Upon a prescribed count being exceeded an alarm is actuated. In this arrangement also the reliability of response is low. This is so primarily because it is not possible to adapt to alternating light conditions. Furthermore variable components such as brightness, structure, movement or direction of movement cannot be evaluated differentially.

It is an object of the invention to provide an improved television-based alarm system which has, or may be designed to have, a response sensitivity and response characteristic which can be varied.

SUMMARY OF THE INVENTION

According to the present invention there is provided an alarm system for detecting a movement or change in the field of view supervised by a television camera, the system comprising a discriminator responsive to the video signal produced by the camera and adapted to produce a signal upon the occurrence of a predetermined characteristic in the picture content of the video signal, at least one means for providing in synchronism with the video signal from the camera a masking signal defining one or more portions of the field of view from which discriminator signals are not required, means for logically coupling the at least one masking signal and the discriminator signals in order to remove any discriminator signals derived from the said one or more portions of the field of view, and means for evaluating the discriminator signals remaining after said logical coupling according to a predetermined criterion to produce an alarm signal when said criterion is satisfied.

BRIEF DESCRIPTION OF THE DRAWING

An embodiment of the invention will now be described by way of example, with reference to the accompanying drawing whose single FIGURE is a block schematic diagram of a television-based alarm system.

DESCRIPTION OF A PREFERRED EMBODIMENT

For the purpose of extending the field of protection to larger objects, or to a plurality of objects remote from one another, the alarm system comprises a plurality of television cameras $\mathbf{1}_1, \mathbf{1}_2 \ldots \mathbf{1}_n$. The video signals generated by these television cameras are sequentially evaluated in time-multiplex mode. For this purpose the individual video signals are delivered to a controlled multi-position switching device 2, the position of the movable contact of which is controlled by a control signal (n) generated by a control device 3. Although the drawing shows the switch 2 symbolically as a mechanical switch, it is to be understood that the switch 2 (and the switches 4, 7, 12 and 15 to be described later) is in fact an electronic switch, for example a semiconductor switch. The cycle time of the control device 3 is so designed that each video signal is passed for evaluation for the duration of a plurality of fields before the video signal generated by another one of the cameras is switched in. The signal available at the output of the first switching device 2 is delivered to a second controlled multi-position switching device 4. To the outputs of the second switching device 4 there are connected a plurality of discriminators $\mathbf{5}_1, \mathbf{5}_2 \ldots \mathbf{5}_m$, any of which can be switched to receive the available video signal by a further control signal (m) generated by the control device 3. The discriminator $\mathbf{5}_1$ to $\mathbf{5}_m$ possess different discriminating functions. The selection of the particular discriminating function at any particular time depends upon the desired characteristic to be detected in the particular scene in the field of view of the television camera whose video signals are at that time passed through the switch 2. The connection sequence of discriminators 5 bears a predetermined relationship to the connection sequence of the cameras 1 and is "programmed" into the control device 3 so that as each camera 1 is switched in the appropriate discriminator 5 is also switched in to receive the video signal from the selected camera.

Each discriminator $\mathbf{5}_1$ to $\mathbf{5}_m$ serves to a first approximation to convert the analog video signal into a series of counting pulses representing the scene viewed by the camera, each pulse being produced upon the occurrence of a particular characteristic in the picture content of the received video signal. For example, one of the discriminators may be an edge discriminator, which, upon a predetermined rate of signal level variation being exceeded in the picture signal delivers a pulse independently of the absolute signal level. For particular scenes other types of edge discriminator may, however, be used, for example discriminators which detect a particular magnitude of edge being exceeded or which detect the repetition of edges above a particular frequency. Because an edge discriminator only registers structural variations, it is particularly suited for evaluating pictures which are characterised by relatively rapid temporary fluctuations such as brightness, e.g. open air scenes (with rapidly vairable lighting caused by moving clouds) but which are irrelevant for the alarm system.

A different kind of discrimination function may be achieved with amplitude discriminators. For example one of the discriminators may be an amplitude discriminator which always delivers a counting pulse if the brightness of the picture exceeds a predetermined threshold value. However other amplitude-dependent discriminators may be used for the detection of certain scenic events, for example a discriminator having a locally-dependent variable threshold or one having several thresholds which are evaluated either additively or selectively on a weighted basis. By means of a discriminator using frequency discrimination, such as frequency selection by filtering or spectral analysis of the video signals, it is possible to derive counting pulses representing further characteristics of the scene under consideration. As mentioned before the particular discriminator 5 selection by the control device 3 for any particular camera 1 is determined beforehand preferably individually and depends upon the nature of the scene viewed and the variations thereof which are to be expected and which it is desired to detect. It is to be noted that discriminators having the functions previously defined are well known in the television art and therefore no further description thereof is deemed necessary.

The counting pulses generated at the outputs of the discriminators $5_1$ to $5_m$ are delivered to one input of an AND gate 6. The other input of the AND gate 6 is connected to the output of a third multi-position controlled switching device 7. At the inputs of the third switching device 7 there are applied masking signals from a plurality of mask generators $8_1$, $8_2$ . . . $8_i$, which signals serve for the detection of certain directions of movement in the scene under consideration. The third switching device 7 is also controlled by a control signal (i) generated by the control device 3.

The masking signals are synchronous with the video signals and each is arranged to allow passage through the AND gate 6 of only those counting pulses derived in respect of predetermined portions of the field of view of the particular camera 1 connected to the switching device 4.

One of the mask generators 8 is preferably arranged to provide a masking signal which limits passage through the AND gate 6 only to those counting pulses derived from vertical strips of the scene being viewed. In combination with a suitable discriminator 5 this enables detection of horizontal movements in the scene.

Another masking generator 8 is preferably arranged to allow passage of pulses only from horizontal strips of the scene, whereby vertical movements may be detected. Yet another masking generator 8 may be arranged to allow passage of counting pulses from portions of the scene arranged in the manner of a checker board, whereby directionally independent movements may be detected.

As in the case of the discriminators 5, the connection sequence of the mask generators 8 bears a predetermined relationship to the connection sequence of the cameras 1 and is programmed into the control device 3 so that as each camera 1 and discriminator 5 is switched in the appropriate mask generator 8 is also switched in. Mask generators are well known in the television art and do not require detailed description here.

The counting pulses which are passed by the selected masking signal at the AND gate 6 are delivered to the input of a second AND gate 9. To the other input of the AND gate 9 there is delivered a further masking signal derived from the output of a further multi-position controlled switching device 12. The purpose of the further masking signal is to limit passage through the AND gate 9 only to counting pulses derived from predetermined portions of the total field of view, for example one or more rectangular portions. The masking provided by the masking signal at AND gate 9 is thus superimposed on that provided by the masking signal at AND gate 6, whereby motion in only a small part of the field of view may be detected, for example.

The masking signal at AND gate 9 is synchronous with the video signal and is produced by whichever of the mask stores $13_1$ . . . $13_n$ is connected to the output of the switching device 12, each of the mask stores 13 being connected to a respective input of the device 12.

As before, the connection sequence of the mask stores 13 to the output of the switching device 12 bears a predetermined relationship to the connection sequence of cameras 1 as determined by the programmed control device 3. As each camera 1 is switched in so is the appropriate mask store 13.

The masking signals stored in the respective stores 13 are generated by a common mask generator (not shown) selectively connectable to each store 13. This mask generator is adjustable thereby to generate for storage masking signals defining different sizes and/or different locations in the field of view for the rectangular portions of the field of view from which the counting signals to be passed by the AND gate 9 are to be derived. Thus each store 13 can be provided with a different masking signal and, furthermore, the adjustable masking generator permits the masking signal in each store 13 to be changed if desired merely by providing a new masking signal for storage. Adjustable mask generators and mask stores are known in the television art.

The counting pulses passed through the AND gate 9 pass through a sequence low pass filter 10 for the suppression of pulses which are too small, to one input of a counter-comparator combination 11. For each camera 1 in connection with the system the counter-comparator combination 11 sums for one field period the individual counting pulses representative of the detected characteristic in the picture content of the video signal and compares the sum with a stored sum derived from the same television camera but during an earlier field period. The previously derived sums are stored in stores $14_1$, $14_2$ . . . $14_n$. The allocation of stored sums for comparison is effected by means of a fifth multi-position controlled switching device 15, the movable contact path of which is switched in synchronism with that of the switching device 2 by the same control signal (n) generated by the control device 3 as is used for the switching of the video signal by the first controlled switching device 2. In the event of there being a predetermined excess or deficit in the sum as compared with the previously stored sum, the counter-comparator combination 11 delivers a so-called "event" pulse, which is delivered to an evaluation device 16.

In the evaluation device 16 the number of pulses relating to the interval of the event is compared with a preselectable value. If the number of pulses relating to the event exceeds this value then an alarm signal is emitted by the evaluation device 16.

By the choice of an appropriate discriminator function in combination with an appropriate movement detecting mask and an appropriate mask for limiting the field of view of a television camera there may be obtained a criterion for the production of an alarm in the event of almost any type of picture variation in a scene within the field of view of the television camera.

I claim:

1. An alarm system for detecting movement or change in the field of view supervised by a television camera, the system comprising a discriminator responsive to the video signal produced by the camera and adapted to produce a digital signal, (hereinafter referred to as a discriminator signal, upon the occurrence of a predetermined characteristic in the picture content of the video signal, at least one means for providing in synchronism with the video signal from the camera a masking signal defining one or more portions of the field of view from which discriminator signals are not required, means for logically coupling the at least one masking signal and the digital discriminator signals in order to remove any discriminator signals derived from the said one or more portions of the field of view, means for counting the number of discriminator signals from the logical coupling means which occur in a predetermined time interval, and means for comparing the sum so formed with a sum formed by counting the discriminator signals which occurred during a previous time interval of the same duration and for generating a further signal when the sums differ by a predetermined amount.

2. A system according to claim 1 in which the time interval is the same as the field period of the television camera.

3. A system according to claim 1 further comprising means for supressing digital discriminator pulse signals below a preselected magnitude from entering the counting means.

4. An alarm system comprising a plurality of television cameras, a plurality of discriminators responsive to the video signals produced by the plurality of cameras and adapted to produce a signal, hereinafter referred to as a discriminator signal, upon the occurrence of a predetermined characteristic in the picture content of the video signal, a plurality of means for providing, in synchronism with the video signal from a selected camera, a masking signal defining one or more portions of the field of view of the television cameras from which discriminator signals are not required, means for logically coupling the masking signals and the discriminator signals in order to remove any discriminator signals derived from the said one or more portions of the field of view, first and second switching means, the first switching means being adapted to connect the cameras sequentially to an input of the second switching means and the second switching means being adapted to connect the input thereof sequentially to the discriminators, a third switching means for sequentially providing the masking signals to the logical coupling means, and means for evaluating the discriminator signals remaining after said logical coupling according to a predetermined criterion to produce an alarm signal when said criterion is satisfied.

5. An alarm system according to claim 4, in which the evaluating means comprises means for counting, in respect of each camera, the number of discriminator signals from the logical coupling means which occur in a predetermined time interval, and means for comparing the sum so formed with a sum formed by counting the number of discriminator signals, derived from the same camera, which occurred during a previous time interval of the same duration and for generating a signal when the sums differ by a predetermined amount.

6. An alarm system according to claim 4, further including a further plurality of masking signals providing means and a fourth switching means adapted for sequentially providing the further masking signals to the logical coupling.

7. A system according to claim 4, in which at least one masking signal defines a plurality of horizontally arranged strip-like portions of the field of view.

8. A system according to claim 4, in which at least one masking signal defines a plurality of vertically arranged strip-like portions of the field of view.

9. A system according to claim 4, in which at least one masking signal defines a plurality of portions of the field of view arranged in the pattern of checker board.

10. A system according to claim 4, wherein at least one discriminator is adapted for the detection of edges in the picture content of the video signal.

11. A system according to claim 10, in which edge detection by the discriminator is effected only when the variation in video signal level exceeds a predetermined rate.

12. A system according to claim 10, in which edge detection by the discriminator is effected only when the magnitude of the edge exceeds a predetermined value.

13. A system according to claim 10, in which edge detection by the discriminator is effected only upon the repetition of edges above a predetermined frequency.

14. A system according to claim 4, in which at least one discriminator is an amplitude discriminator.

15. A system according to claim 14, in which the amplitude discriminator is adapted to generate a signal if the brightness of the picture exceeds a predetermined value.

16. A system according to claim 15, in which the amplitude discriminator has a threshold which varies in dependence upon the position in the field of view from which the video signal is derived.

17. A system according to claim 14, in which the amplitude discriminator has several thresholds.

18. A system according to claim 17, in which the several amplitude thresholds are evaluated in a like manner.

19. A system according to claim 17, in which the several amplitude thresholds are evaluated on a weighted basis.

20. A system according to claim 4, in which at least one discriminator is a frequency discriminator.

21. A system according to claim 20, in which the frequency discrimination is effected by filtering.

22. A system according to claim 20, in which the frequency discrimination is effected by spectral analysis.

23. A system according to claim 4, in which at least one masking signal defines one or more rectangular portions of the field of view.

24. A system according to claim 23, further comprising means for changing the number, position and size of the rectangular portions defined by the masking signal.

25. An alarm system comprising at least one television camera, each camera producing a video signal indicative of the content of the field of view of the camera, at least one discriminator means responsive to the video signal for producing a digital discriminator signal upon the occurence of a predetermined characteristic in the video signal, at least one masking signal means for providing, in synchronism with the video signal from at least one camera, a masking signal defining one or more portions of the field of view from which discriminator signals are not required, logical coupling means for logically coupling the at least one masking signal and the digital discriminator signals in order to remove any discriminator signals derived from the said one or more portions of the field of view, counting means for counting the number of digital discriminator signals occurring within the unmasked portion of the field of view, and evaluating means for evaluating the counted number of digital discriminator signals according to a predetermined criterion to produce an alarm signal when said criterion is satisfied.

26. A system according to claim 25, in which at least one discriminator is an amplitude discriminator.

27. A system according to claim 26, in which the amplitude discriminator produces a digital discriminator signal each time the brightness of the picture exceeds a predetermined value.

28. A system according to claim 27, in which the amplitude discriminator has a threshold which varies as a function of the position in the field of view from which the video signal is derived.

29. A system according to claim 26, in which the amplitude discriminator has several thresholds.

30. A system according to claim 29, in which the several amplitude thresholds are evaluated in a like manner.

31. A system according to claim 29, in which the several amplitude thresholds are evaluated on a weighted basis.

32. A system according to claim 25, wherein at least one discriminator produces a digital discriminator signal in response to the detection of edges in the picture content of the video signal.

33. A system according to claim 32, in which edge detection by the discriminator is effected only when the variation in video signal level exceeds a predetermined rate.

34. A system according to claim 32, in which edge detection by the discriminator is effected only when the magnitude of the edge exceeds a predetermined value.

35. A system according to claim 32, in which edge detection by the discriminator is effected only upon the repetition of edges above a predetermined frequency.

36. A system according to claim 32, in which at least one discriminator is a frequency discriminator.

37. A system according to claim 36, in which the frequency discrimination is effected by filtering.

38. A system according to claim 36, in which the frequency discrimination is effected by spectral analysis.

39. A system according to claim 32, in which at least one masking signal defines a plurality of rectangular portions of the field of view.

40. A system according to claim 39, further comprising means for changing the number, position and size of the rectangular portions defined by the masking signal.

41. A system according to claim 32, in which at least one masking signal defines a plurality of horizontally arranged strip-like portions of the field of view.

42. A system according to claim 32, in which at least one masking signal defines a plurality of vertically arranged strip-like portions of the field of view.

43. A system according to claim 32, in which at least one masking signal defines a plurality of portions of the field of view arranged in the pattern of a checker board.

* * * * *